REGISTER FOR A CALCULATOR THAT UTILIZES "EXCESS 3" CODE

Filed Oct. 27, 1964 8 Sheets-Sheet 1

INVENTORS
ATSUSHI ASADA
YOSHIHISA UCHIDA
BY
ATTORNEY

REGISTER FOR A CALCULATOR THAT UTILIZES "EXCESS 3" CODE

Filed Oct. 27, 1964

8 Sheets-Sheet 2

INVENTORS
ATSUSHI ASADA
YOSHIHISA UCHIDA
BY [signature]
ATTORNEY

INVENTORS
ATSUSHI ASADA
YOSHIHISA UCHIDA
BY [signature]
ATTORNEY

INVENTORS
ATSUSHI ASADA
YOSHIHISA UCHIDA
BY Eugene E. [signature]
ATTORNEY

REGISTER FOR A CALCULATOR THAT UTILIZES "EXCESS 3" CODE

Filed Oct. 27, 1964

8 Sheets-Sheet 5

INVENTORS
ATSUSHI ASADA
YOSHIHISA UCHIDA
BY
ATTORNEY

INVENTORS
ATSUSHI ASADA
YOSHIHISA UCHIDA
BY
ATTORNEY

INVENTORS
ATSUSHI ASADA
YOSHIHISA UCHIDA
BY
ATTORNEY

REGISTER FOR A CALCULATOR THAT UTILIZES "EXCESS 3" CODE

Filed Oct. 27, 1964 8 Sheets-Sheet 8

INVENTORS
ATSUSHI ASADA
BY YOSHIHISA UCHIDA
ATTORNEY 3,375,355
Patented Mar. 26, 1968

3,375,355

REGISTER FOR A CALCULATOR THAT UTILIZES "EXCESS 3" CODE

Atsushi Asada, Osaka, and Yoshihisa Uchida, Kobe, Japan, assignors to Hayakawa Denki Kogyo Kabushiki Kaisha, Osaka, Japan, a company of Japan Filed Oct. 27, 1964, Ser. No. 406,863
Claims priority, application Japan, Nov. 1, 1963, 38/58,484, 38/58,485; Nov. 6, 1963, 38/59,358, 38/59,359, 38/59,360, 38/59,361; Nov. 16, 1963, 38/61,529
8 Claims. (Cl. 235—156)

This invention relates to a computer, and more particularly to an electronic table model computer and method of operation.

Table model computers of the conventional type are either manual or motor driven, and all of them are operated mechanically. In such mechanical computers, the operation is slow, noise is generated, the indicated figure is small in size and difficult to see clearly, and troubles are very frequent and difficult to correct.

One object of this invention is to eliminate various disadvantages mentioned above inherent in mechanical computers.

It has been known that the electronic computer has a high efficiency, and that it can provide answers to very complicated calculations at very high speed. On the other hand, the operation of the normal electronic computer is performed in accordance with a particular program, and even though the programed computer does enable the solution of a wide variety of mathematical computations, in the case of a complicated calculation its setting operation is troublesome, its structure is complicated and it is not suitable for the use in connection with simple calculations such as those required in accounting operations.

Another object of this invention is to simplify the constitution of the electronic computer so that it can be utilized as a table model by the use of a control counter in place of the programing system, and to simplify the manipulation of the computer in the field of relatively simple calculation. A preferable example of the control counter in accordance with this invention is one which consists of only four flip-flops, and even though it generates only ten kinds of signals, it can perform the operations of addition, subtraction, multiplication, division and related calculations which are required regularly and frequently even if the number of figures is many.

In a preferred example of this embodiment of the invention, the control counter can handle the following states of operation:

A. Stop
B. Decimal point count
C. Conversion into complement
D. Addition
E. Figure carry process
F. End around carry
G. Shift preparation
H. Simultaneous complement conversion and shift
J. Conversion into complement
K. Operation completion Signals of various kinds which are to be fed to the counter are controlled by keys which instruct the kinds of operations and the states of said control counter.

The term "complement" which is referred to in the states C, H and J of the control counter means a number which when added to a separate number produces the digit "9." This terminology applies hereinafter except as otherwise defined.

Another object of this invention is to provide means for performing the complementization in a simple manner which is necessary in the operation. For this purpose, decimal counters of the "excess 3" system are used in the register. A supplemental path is completed between one to the other of four units of flip-flops which constitute a decimal counter by the signal which instructs the complementization. Then, when a pulse is applied to the flip-flop of the primary stage, the contents of the decimal counter is converted into the complement.

A further object of this invention is to provide means for quickly disposing of a figure carry output when it is produced in any of the decimal counters in the register. For this purpose, according to this invention, there is used, in addition to the main pulse, which is counted in the register as a timing signal, a sub-pulse which is delayed by a half interval from said main pulse, that is, being delayed by a half cycle. When the figure carry output appears in the counter of a certain figure of the register, the supplemental flip-flop belonging to said figure is set, a sub-pulse is fed into the next succeeding figure due to the setting signal, and at the same time said supplemental flip-flop is reset by said sub-pulse. As the counting operation of the counter is normally done with the main pulses, the sub-pulse having a different phase from that of said main pulse can be introduced into the counter of the upper figure without interfering with the counting of the main pulses, and can increase the contents thereof by one.

A still further object of this invention is to provide means for quickly performing the operation to shift the digit of each figure of the register as it is to the upper figure. This operation is commenced by first supplying sub-pulses to the counter of the uppermost figure and supplying the main pulses to the figure next thereto. In case a certain number $x$ is already counted in said next figure, the digit of said figure becomes "0" when $(10-x)$ pieces of the main pulses come in, and simultaneously the figure carry output appears. When the supply of the main pulses and the sub-pulses is cut off by said figure carry output, it becomes such as that $(9-x)$ pieces of the sub-pulses, that is, the numbers corresponding to the complements, are introduced into the uppermost figure. When a similar operation is applied in order toward lower figures, all of the figures are complementized and simultaneously shifted. The digits thus shifted are all in the form of the complement, and, therefore, by the conversion into complement again by the above mentioned means, these can be returned back to the original digits.

A still further object of this invention is to enable efficient calculation of addition, subtraction, multiplication and division with the above mentioned computer.

The above and other objects of this invention will be more clearly understood from the detailed explanations made hereinafter referring to the drawings; wherein FIGURE 1 is a diagram of the keyboard or panel of the computer in accordance with the invention.

FIGURES 8A through 8C are the diagrams showing the supply circuits of signal $\gamma_1$ shown in FIGURE 4.

*Keyboard*

Figure 1:
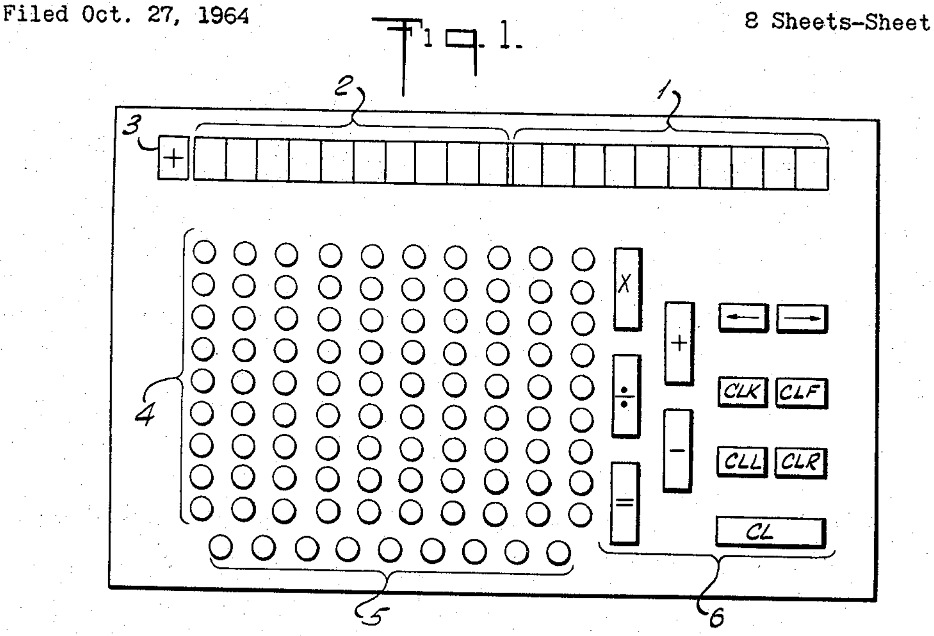

The panel or keyboard is shown in FIGURE 1. Figure indicating windows for "$2m$" digits (in this instance 20 digits) are provided along the upper edge of the panel and the windows are divided into a lower half portion 1 and an upper half portion 2. Adjacent to the left end of the upper half portion of the windows 2 is a sign window 3 for the display of the signs + and − to indicate the sign of the digits appearing in the windows. The display of the digits and signs in the windows is made by flow discharge tubes or other suitable means.

The left half portion of the panel is provided with the figure setting button group 4 consisting of "$m$" columns of "1" to "9" buttons. A decimal point button group 5 is so provided below the button group 4 with each decimal button being positioned at the midpoint between each pair of columns 5. All of these buttons are coupled by relays (not shown) behind the panel which are operated when the buttons are depressed and remain in the operated condition until a reset signal is applied.

The right portion of the panel includes designating keys for +, −, ×, ÷, for addition, subtraction, multiplication and division respectively, operation designating key = for multiplication and division operation, shift keys having left and right arrows for shifting the digits in the indicating windows 1 and 2 to the left or to the right, clearing key CLK for clearing the figure setting button group 4, clearing key CLF for clearing the designating keys for addition, subtraction, multiplication and division, clearing keys CLL and CLR for clearing the indication in respective half portions of the indicating windows, and resetting key CL for resetting the contents of register 17 which will be discussed more fully hereinafter.

*Constitution of computer*

Figure 2:
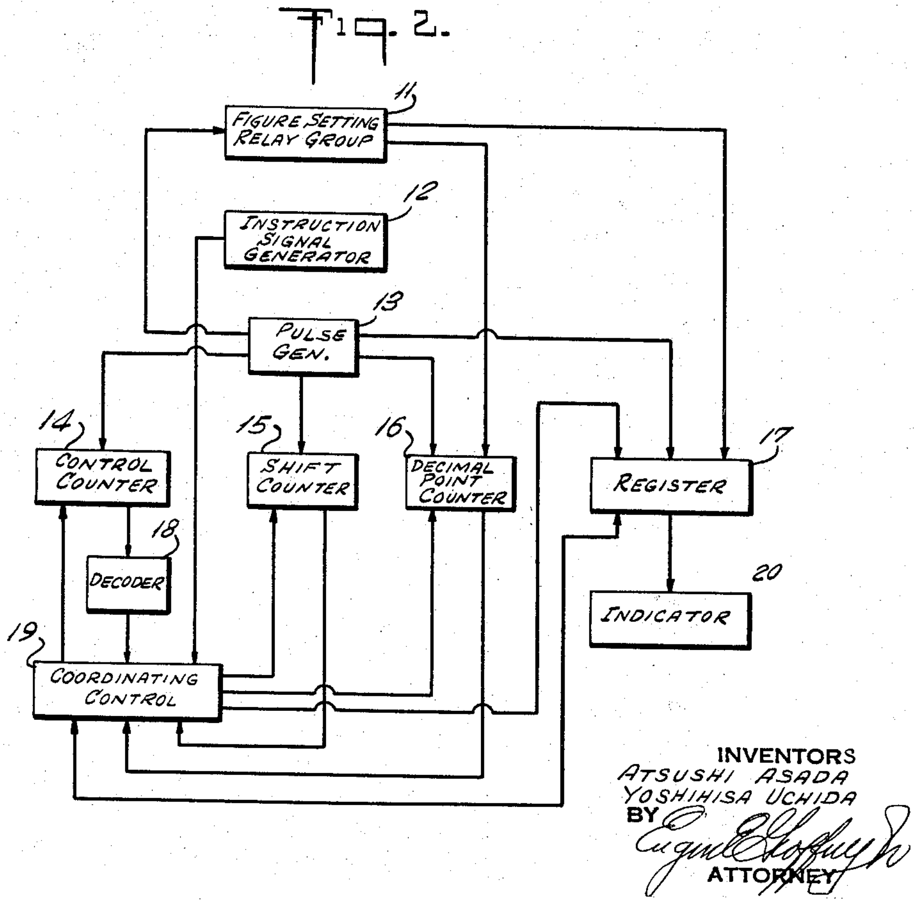
FIGURE 2 is a block diagram of the computer in accordance with the invention.
Figure 3:
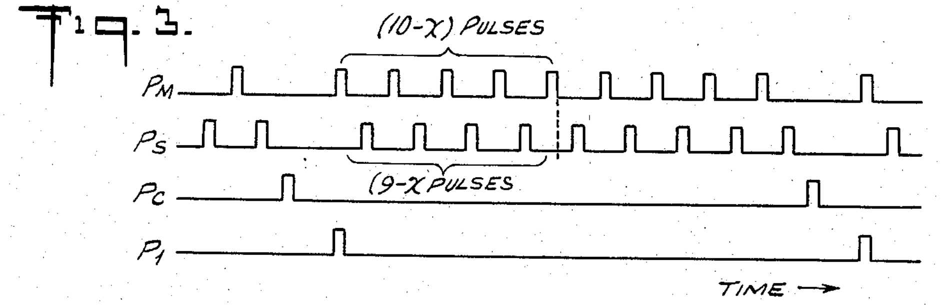
FIGURE 3 is a diagram of wave shapes of timing signals including four kinds of pulses which are used in the example of this embodiment of the invention.

A diagrammatic illustration of the computer in accordance with the invention is shown in FIGURE 2. The figure setting relay group 11 is operated by the push buttons 4 and 5 on the panel, and instruction signal generator 12 is operated by the key group 6 on the panel. Pulse generator 13 generates such four sets of timing pulses $Pc$, $P_1$, $Pm$ and $Ps$ having phase relationship as shown in FIGURE 3. Pulses $Pm$ are in the form of nine pulses appearing successively at a constant rate, and each group of pulses are separated by an interval corresponding to the interval between alternate pulses. The supplemental pulses $Pc$ occur at the center of the interval between successive groups of pulses $Pm$, supplemental pulses $P_1$ are each synchronized with the first pulse of each group of pulses $Pm$, and sub-pulses $Ps$ occur in groups of nine pulses which are delayed by a half interval or cycle with respect to $Pm$ pulses. The pulse generator 13 supplies the timing pulses to control counter 14, shift counter 15 and decimal point counter 16, and also supplies said timing pulses through the figure setting relay group 11 to the decimal counter 16 and register 17. The state of the control counter 14 is decoded by decoder 18, and signal from the decoder is fed to coordinating control 19. The control 19 produces a control signal in response to an instruction signal received from the instruction signal generator 12, the decoded signal from the decoder 18, and the output signals from the shift counter 15, the decimal point counter 16 and the register 17, and the resultant signal together with said control signal from the control counter 14 controls the shift counter 15, the decimal point counter 16 and the register 17. The contents of the register 17 is displayed by the indicator 20 which includes the indicating windows 1 and 2 on the panel.

*Control counter*

The control counter 14 consists of four sets of flip-flop decimal counters and performs the tasks required by the ten states of operation which are as follows:

(A) Stop, and interrupt all operation.

(B) If the contents of the register are cleared, the decimal point of the figure which is set is counted, and if figure is memorized in the register, the decimal point counting is not done. It resets the shift counter 15. , (C) Digits in the register are converted into their complements, but the sign of the figure is maintained as it is.

(D) Newly set figure is added to the digits in the register.

(E) If it is necessary to make a carry due to the addition, said carry is processed.

(F) An end-around-carry is performed, that is, one is added to the first figure and, at the same time, the sign is reversed.

(G) Shift is prepared. $2m+1$ figure is reset.

(H) The digits of each figure are converted to their complements, and are offset by one figure respectively. One is added to the decimal point counter.

(J) The digits in the register are converted into their complements, but the sign of said figure is maintained as it is.

(K) Stop, and unnecessary portions are reset.

The above mentioned states are converted by the decoder 18, into the signals (A), (B), (C), (D), (E), (F), (G), (H), (J) and (K). The signals $(\overline{A})$, $(\overline{B})$, $(\overline{C})$, $(\overline{D})$, $(\overline{E})$, $(\overline{F})$, $(\overline{G})$, $(\overline{H})$, $(\overline{J})$ and $(\overline{K})$ respectively indicate that such decoded signals are not generated.

*Register*

Figure 4:
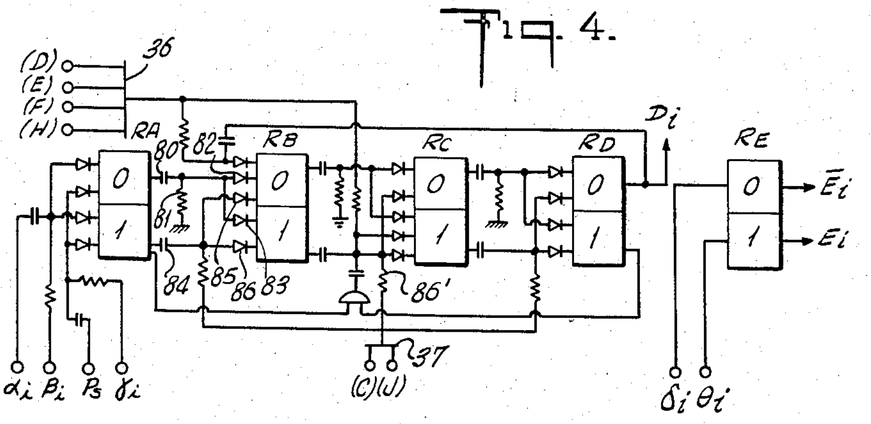
FIGURE 4 is a circuit diagram of a decimal counter used in the register of the example of this embodiment of the invention.

The register 17 consistsof $2m+1$ sets of computing circuits each of which consists of a decimal counter and a supplemental flip-flop, as shown in FIGURE 4. Each of the decimal counters has four flip-flops $R_A$, $R_B$, $R_C$ and $R_D$, and is so connected that "excess 3" code is utilized. The supplemental flip-flop is denoted by $R_E$. A suffix is affixed to each of the decimal counters, the supplemental flip-flop and signals related thereto from 1 to $2m+1$ according to the corresponding figure. The subscript "$i$" identifies all signals from 1 to $2m+1$.

Figures 5, 8:
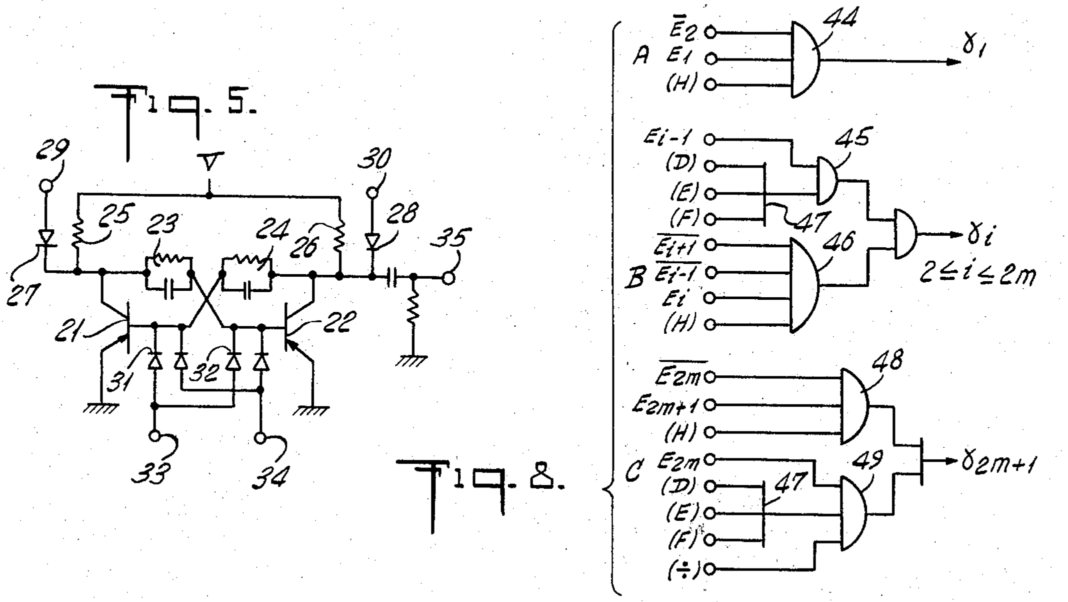
FIGURE 5 is a detailed circuit diagram of the flip-flops which constitute the counter shown in FIGURE 4.

As is shown in FIGURE 5, each flip-flop circuit includes a pair of transistors 21 and 22. The collector and base of the transistors 21 and 22 are connected crosswise by coupling means 23 and 24, each of which consists of a resistor and a capacitor. The emitter of each transistor is grounded, and the operating current of each transistor is supplied to its collector from power source V through load resistors 25 and 26. Terminals 29 and 30 are connected through diodes 27 and 28 with the collectors of said transistors. A signal applied to one of said terminals sets the flip-flop and a signal applied to the other terminal resets the flip-flop. Terminal 33, which is connected through diodes 31 and 32 with the bases of transistors 21 and 22 respectively, constitutes an input to the flip-flop. An input terminal 34 may be provided similarly in parallel with the terminal 33. The output of the flip-flop is derived from output terminal 35 which is connected with the collector of the transistor 22.

FIGURE 4 is typical of each decimal counter and the supplemental flip-flop circuitry. In the flip-flop $R_A$ of the first stage, there is provided an input circuit to which signal inputs $\alpha_i$ and $\beta_i$ are fed and an input circuit to which signal $\gamma_i$ and pulse $Ps$ are fed. In the flip-flops $R_B$ and $R_C$, input circuit is provided to which signals (D), (E), (F) and (H) are fed through the "or" gate 36. Further, in flip-flops $R_C$ and $R_D$, there is included an input circuit to which signals (C) and (J) are fed through the "or" gate 37. The output of the decimal counter, that is, the output which appears in the final stage flip-flop $R_D$, is denoted by $Di$. The above mentioned signals (D), (E), (F), (H) and (C), (J) are the signals which are generated when the state of the control counter 14 is in the states D, E, F, H, C and J. In addition, there is provided an input circuit to which signal $\delta_i$ is fed to the reset side of the supplemental flip-flop $R_E$ and an input circuit to which signal $\theta_i$ is fed at the set side of said flip-flop. The output of said flip-flop $R_E$ is denoted by $Ei$.

For a more complete understanding of the operation of the register illustrated in FIGURE 4, the steps of recording digits 1 through 9, the shift from 9 to 0 and the automatic production of a complement of the digit represented by the flip-flops will now be described. It is understood that the flip-flop $R_D$ represents the most significant digit though in the following description and to facilitate an understanding of the operation, the binary code digits representing a decimal digit will be given in the reverse order.

In the excess 3 code, the decimal digit 0 is represented in the flip-flops $R_A$ through $R_D$ as 1100. Furthermore, $\gamma_i$ is normally at −4 volts, $\beta_i$ is normally at 0 volt and the gate 36 has an output of 0 volt during an adding operation. Under these conditions, let it be assumed that a pulse $\alpha_i$ is applied to the input of the register, this will cause $R_A$ to shift to 0. A pulse is then produced through the condenser 80 causing $R_B$ to shift to 0. $R_B$ in turn causes $R_C$ to shift to 1. The output signal for $R_C$ cannot affect $R_D$ since input of $R_D$ is at a −4 volts because of its connection to gate 37. Therefore, the flip-flops will read in the binary code 0010 or the numeral 1 in the decimal system. Upon the application of a second $\alpha_i$ pulse $R_A$ will shift to 1. This will produce a pulse through condenser 81, but since gate 37 is at −4 volts, $R_B$ will remain unaffected and therefore will remain at 0. Since flip-flops $R_C$ and $R_D$ are also unaffected, the register will read 1010 or the numeral 2. The same operation continues with the application of each successive pulse $\alpha_i$ until the flip-flops read 0011 or the decimal digit 9. It will be observed that the "and" gate functions only when the register is shifted from 9 to 0 as zero signals are supplied to the "and" gate from both flip-flops $R_A$ and $R_D$. In all other cases, either one or the other inputs to the "and" gate is at −4 volts and thus inactivates the "and" gate.

When the register is to be shifted from 9 to 0, the gate 37 remains at −4 volts and the gate 36 remains at 0 volt. Under these condtions the application of an $\alpha_i$ pulse to the flip-flop $R_A$ will shift it to 1. Because gate 37 is at −4 volts $R_A$ cannot affect $R_B$ but a 0 volt pulse will be applied to the "and" gate. Inasmuch as flip-flop $R_D$ is also producing an output voltage of 0 volt which is fed to the "and" gate, a pulse is therefore applied to $R_C$ causing it to shift to 0. This in turn produces a pulse which is applied to flip-flop $R_D$ causing it to shift to 0. In so doing an output pulse from $R_D$ is fed back to the input of $R_B$ causing it to shift to 1. Thus the flip-flops will now indicate 1100 which is 0 in the decimal system.

When it is desired to record the complement of a number in a register, the gate 36 is shifted to −4 volts while the gate 37 applies 0 volt to the register. If the decimal digit 8 is recorded in the register, then in the excess 3 code the register will indicate 1101, it of course being understood that these binary numerals are presented in the reverse order. Upon the application of a pulse to flip-flop $R_A$ that flip-flop will shift to 0. The output of the flip-flop will pass through condenser 80 and actuate flip-flop $R_B$ shifting it to 0. The output from $R_B$ operates $R_C$ shifting it to 1. Since the gate 37 is at 0 volt the output of $R_C$ will cause $R_D$ to shift to 0. While $R_D$ will produce an output, the output cannot affect $R_B$ through the feedback circuit since gate 36 is at −4 volts and therefore prevents any operation of $R_B$. As a result, the register will read 0010 which is the complement of the decimal digit 8 in the excess code 3.

The above mentioned signals $\alpha_i$, $\beta_i$, $\gamma_i$, $\delta_i$ and $\theta_i$ and other counter input signals are developed in the coordinating control 19. Means for composing or developing the signals $\alpha_i$, $\beta_i$, $\gamma_i$, $\delta_i$ and $\theta_i$ in the control 19 are shown in FIGURES 6 to 9.

Figures 6, 7, 9, 10:
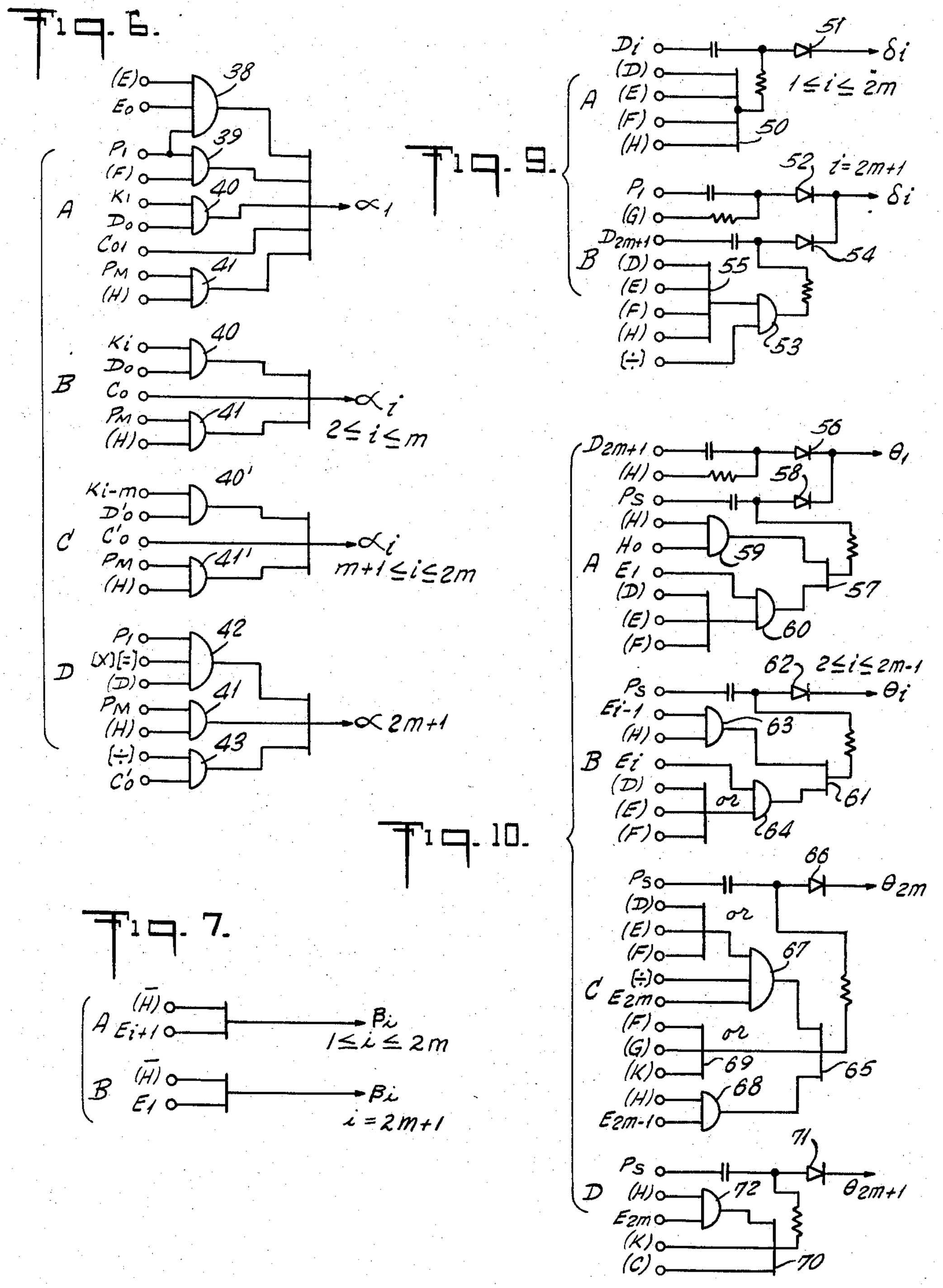
FIGURES 6A through 6D are the diagrams showing the supply circuits of signal $\alpha_1$ shown in FIGURE 4.
FIGURES 7A and 7B are the diagrams showing the supply circuits of signal $\beta_1$ shown in FIGURE 4.
FIGURES 9A and 9B are the diagrams showing the supply circuits of signal $\delta_i$ shown in FIGURE 4.
FIGURES 10A through 10D are the diagrams showing the supply circuits of signal $\theta_i$ shown in FIGURE 4.

The circuit which supplies the signal $\alpha_i$ is shown in FIGURE 6. The circuit for producing the signal $\alpha_i$ and which feeds it to the counter 14 corresponding to the first figure is shown in FIGURE 6A. It includes four "and" gates 38, 39, 40 and 41, and the consolidation of the output of these gates and the signal $Co_1$ constitutes the signal $\alpha_i$. The signals (E), $Eo$ and $P_1$ are fed to the gate 38, the signals $P_1$ and (F) are fed to the gate 39, the signals $K_1$ and $Do$ are fed to the gate 40, and the signals $Pm$ and (H) are fed to the gate 41. The above mentioned signals (E), (F) and (H) are control counter signals, $P_1$ and $Pm$ are the timing pulses shown in FIGURE 3, $K_1$ is the timing pulse $Pm$ which passed through the figure setting relay group 11 and represents the figure or digit corresponding to the number of pulses produced by depression of the push button 4 for the first digit, $Eo$ is the signal which is produced at the time of division operation, $Do$ is the signal which is produced at the time that the signal $K_1$ from the figure setting relay group 11 is fed into the lower half portion 1 of the register 17, and $Co_1$ is the signal which is produced at the time that the contents of the lower half portion 1 of the register are converted into their complements.

FIGURE 6B illustrates a supply circuit for producing the signal $\alpha_i$ which is fed to the counter 14 corresponding to the second through the remainder of the "$m$" number of figures, and said supply circuit is the same as the $\alpha_i$ supply circuit of FIGURE 6A but does not include the gates 38 and 39. Furthermore, the supply circuit for producing the signals $\alpha_i$ representing digits "$m+1$" through "$2m$" is shown in FIGURE 6C, and this is substantially the same as the supply circuit shown in FIGURE 6B. However, in FIGURE 6C, the signal $Co'$ is utilized in place of $Co$ and the Signal $Do'$ in place of the signal $Do$. These signals are fed to the gate 40' in place of the gate 40. The above mentioned signal $Do'$ is the signal which is produced at the time that the signal $Ki$ is put into the upper half portion 2 of the register, that is, in "$m+1$" through "$2m$" figures or digits, and the signal $Co'$ is the signal which causes the conversion of the figures in the upper half portion 2 of the register into their complements.

The circuit for producing the signal $\alpha_{2m+1}$ which is fed to the counter 14 corresponding to "$2m+1$" figure is shown in FIGURE 6D. It has three "and" gates 41, 42 and 43, and the consolidated output of these gates is $\alpha_{2m+1}$. The gate 41 is substantially the same as the aforementioned gates 41 in FIGURES 6A and B. The signals $P_1$, (×) and (=) and (D) are supplied to the gate 42, and the signals (÷) and $Co'$ are supplied to the gate 43. Signal (D) is the control counter signal and (×), (÷) and (=) are the signals produced by the instruction signal generating portion 12 when the corresponding keys in the key group 6 are pushed.

The circuit for producing signal $\beta_i$ is shown in FIGURE 7A and FIGURE 7B, and this supply circuit consolidates the signal $(\overline{H})$ with either the signal $Ei+1$ or $E_1$. As is shown in FIGURE 7A, the signals $(\overline{H})$ and $Ei+1$ are supplied to the counters corresponding to the first through "$2m$" figures, and the signals $(\overline{H})$ and $E_1$ are supplied to the counter which corresponds to "$2m+1$" figure. The signal $(\overline{H})$ is the signal which is produced when the state of the control counter 14 is not H, $Ei+1$ is the output of the supplemental flip-flop of the next succeeding figure, and $E_1$ is the output of the supplemental flip-flop of the first figure.

A supply circuit of the signal $\gamma_i$ is shown in FIGURE 8. The circuit which supplies the signal $\gamma_i$ to the counter of the first figure is shown in FIGURE 8A, and includes an "and" gate 44 to which the signals $\overline{E}_2$, $E_1$ and (H) are fed. $\overline{E}_2$ is the signal of the time that the supplemental flip-flop of the second figure is not producing the output $E_2$, and $E_1$ is the output of the supplemental flip-flop which belongs to the first figure to which the signal $\gamma_i$ is supplied.

The circuit which supplied the signal $\gamma_i$ to the counters of the second through "$2m$" figures consolidates the outputs of the "and" gates 45 and 46, as is shown in FIGURE 8B, to obtain the signal $\gamma_i$. The signal $Ei-1$ and the output of the "or" gate 47 are supplied to the gate 45, and the "or" gate 47 is operated by the control counter signals (D), (E) and (F). The signals $Ei+1$, $Ei-1$, $Ei$ and (H) are supplied to the gate 46. $Ei$ is the output of the supplemental flip-flop which belongs to the "$i$" figure to which the signal $\gamma_i$ is supplied, and $Ei+1$ and $Ei-1$ are the outputs of the supplemental flip-flops of the next succeeding figure and the netx preceding from the said "$i$" figure.

The circuit which supplies $\gamma_{2m+1}$ to the counter of the "$2m+1$" figure obtains the signal $\gamma_{2m+1}$ by consolidating the outputs of the "and" gates 48 and 49 as is shown in FIGURE 8C. The signals $\overline{E}_{2m}$, $\overline{E}_{2m+1}$ and (H) are supplied to the "and" gate 48, and the signals $E_{2m}$, (÷) and the output of the "or" gate 47 are supplied to the "and" gate 49. Said signals $\overline{E}_{2m+1}$ and $E_{2m}$ are the outputs of the supplemental flip-flops of the "$2m+1$" figure and "$2m$" figure respectively, $\overline{E}_{2m}$ is the output of the supplemental flip-flop of the "$2m$" figure, and the signals (D), (E) and (F) are supplied to the gate 47 in the same manner as illustrated in FIGURE 8B.

The supply circuit for the signal $\delta_i$ with respect to the supplemental flip-flops of each of the figures is shown in FIGURE 9. The supply circuits for the first through the "$2m$" figures consolidate the counter output D$i$ and the output of the "or" gate 50 as is shown in FIGURE 9A. The supply circuit with respect to the supplemental flip-flops for the first through the "$2m$" figures consolidate the counter output D$i$ and the output of the "or" gate 50, and supplies the signal $\delta_i$ through the diode 51. The control counter signals (D), (E), (F) and (H) are given to the "or" gate 50. A suply circuit of the signal $\delta_{2m+1}$ with respect to the "$2m+1$" figure consolidates the signals $P_1$ and (G), as is shown in FIGURE 9B, and supplies said signal through the diode 52, and in parallel therewith it consolidates the signal $D_{2m+1}$ and the output of the "and" gate 53 and supplies the consolidated signal through the diode 54. The output signal of the "or" gate 55 to which the control counter outputs (D), (E), (F) and (H) are supplied and the division operation signal (÷) are fed to the "and" gate 53.

The circuit for producing the signal $\theta_i$ is shown in FIGURE 10. The supply circuit of the signal $\theta_i$ for the supplemental flip-flop of the first figure consolidates the counter output $D_{2m+1}$ of the "$2m+1$" figure and the control counter signal (H) as is shown in FIGURE 10A, it supplies the consolidated signal through the diodes 56, and in parallel therewith it consolidates the timing pulse $P_s$ and the output of the "or" gate 57 to supply the consolidated signal through the diode 58. The outputs of the "and" gates 59 and 60 are supplied to the "or" gate 57, the control counter signal (H) and the signal H$o$ are fed to the gate 59, and the output $E_1$ of the corresponding supplemental flip-flop and the "or" output of the control counter signals (D), (E) and (F) are supplied to the gate 60. The signal H$o$ is the signal which is given at the time that the computer is not making the round shift.

The supply circiut of the signal $\theta_i$ with respect to the second through the "$2m-1$" figures consolidates the timing pulse P$s$ and the output of the "or" gate 61 as is shown in FIGURE 10B, and supplies the consolidated signal through the diode 62. The outputs of the "and" gates 63 and 64 are fed to the "or" gate 61, the supplemental flip-flop output $Ei-1$ of the next preceding figure and the control counter signal (H) are fed to the gate 63, and the supplemental flip-flop output E$i$ of the corresponding figure and the "or" output of the control counter signals (D), (E) and (F) are fed to the gate 64.

A circuit which computes the signal $\theta_m$ to the supplemental flip-flop of the "$2m$" figure is shown in FIGURE 10C and consolidates the timing pulse P$s$ and the output of the "or" gate 65, and supplies the consolidated signal through the diode 66. The outputs of the "and" gates 67 and 68 and the "or" gate 69 are fed to the "or" gate 65. The "or" output of the control counter signals (D), (E) and (F), the division signal (÷) and the output $E_{2m}$ of the suplemental flip-flop of the corresponding figure are given to the gate 67. The control counter signal (H) and the supplemental flip-flop output $E_{2m-1}$ of the figure reduced by one are fed to the gate 58, and the control counter signals (F), (G) and (K) are fed to the gate 69.

The circuit which computes the signal $\theta_{2m+1}$ to the supplemental flip-flop of the "$2m+1$" figure consolidates the timing pulse P$s$ and the output of the "or" gate 70 as is shown in FIGURE 10D, and supplies the consolidated signal through the diode 71. The output of the "and" gate 72 and the control counter signals (K) and (C) are fed to the "or" gate 70, and the control counter signal (H) and the suplemental flip-flop output $E_{2m}$ of the "$2m$" figure are fed to the "and" gate 72.

*Converting operation into complement*

The "excess 3" code is used in this invention when all of the flip-flops $R_A$, $R_B$, $R_C$ and $R_D$ which constitute the counter are reversed and the conversion into complement with respect to "9" is accomplished. These flip-flops forward signals to the flip-flop of the next stage from "0" of reset side by means of capacitor 80 (FIGURE 4), grounded resistor 81 and diodes 82 and 83 so that the regular counting is made normally. In order to make a conversion into the complement, there is provided coupling means from the set side of one flip-flop to the flip-flop of the next stage through capacitor 84 and diodes 85 and 86, but said coupling means is normally cut off by an application of a proper negative bias so that it does not interfere with the regular counting. However, when the control counter signal (C) or (J) is fed to the coupling means through resistor 86' so that said negative bias is cancelled and the coupling means becomes conductive, and when either variation of setting or resetting of the flip-flop occurs, the variation is transferred to the flip-flop of the next stage.

The signal $\alpha_i$ which is supplied to the primary stage flip-flop $R_A$ contains the signals $Co_1$ and $Co$ or $Co'$ as was previously explained in connection with FIGURE 6. Accordingly, if the signal $Co_1$ is applied when the control counter signal (C) or (J) is being supplied, first the primary flip-flop is reversed, the variation propagates successively to the following flip-flops, and the contents of the counter of the first figure are completely reversed. Similarly, when the signal $Co$ or $Co'$ is applied while the signal (C) or (J) is being supplied the contents of the counter of the second through "$m$" figures or the "$m+1$" through the "$2m$" figures are reversed, thereby the contents of the register are changed into their complements, and this performance can be done separately with respect to the upper half portion 2 and the lower half portion 1 of the register 17 respectively.

*Figure carry operation*

Figure 11:
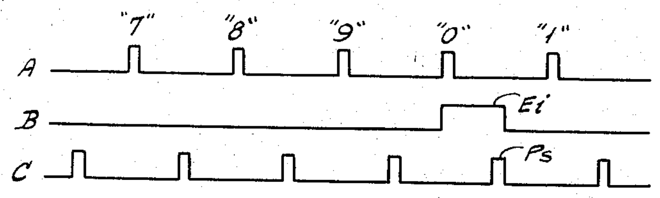
FIGURE 11 is an explanatory diagram of the carrying figure operation in the register in accordance with the invention.

When a number of certain figures shown in FIGURE 4 is memorized in the counter and is increased in synchronization with the timing pulse P*m* as is shown in FIGURE 11A and exceeds "9," the counter output D*i* is produced at the time that the memorized number shifts from "9" to "0." One of the control counter signals (D), (E), (F) and (H) is generated at the time of addition, figure carry, end-around-carry, and shift, the bias of the diode 51 shown in FIGURE 9A is, therefore, increased to 0 volt, and, as a result, the counter output D*i* passes through the diode 51, it is introduced as the signal $\delta_1$ into the supplemental flip-flop $R_E$, and the supplemental flip-flop $R_E$ is then reset. The set output of the supplemental flip-flop $R_E$, that is, the figure carry output E*i*, is applied as $E_{1-1}$ to the next succeeding figure.

As mentioned above with respect to a certain figure, the figure carry output $E_{1-1}$ is received from the next preceding figure, and at this time, some of the control counter signals (D), (E) and (F) are existing as indicated above. Accordingly, the "and" gate 45 of FIGURE 8B is turned on, the signal $\gamma_1$ is applied to the counter, and while said signal is being applied, the counter is made to operate by the timing pulse P*s* which is shown in FIGURE 11B. As a result, the contents of the counter is increased by one.

On the other hand, the signal $\theta_1$ is supplied to the set side of the above mentioned supplemental flip-flop, that is, the next preceding figure, and the figure carry signal E*i* is generated by said flip-flop. As is shown in FIGURES 10A and 10B, the figure carry signal E*i* passes through the "and" gate 60 or 64, and it enables the timing pulse P*s* to go through the diode 58 or 62. Thus, the timing pulse P*s* is applied to the set side of the supplemental flip-flop as the signal $\theta_1$, said signal thereby resets said supplemental flip-flop, and terminates the figure carry signal E*i*. Accordingly, the increase of the contents of the next succeeding figure is limited to one.

*Shift operation*

Figure 12:
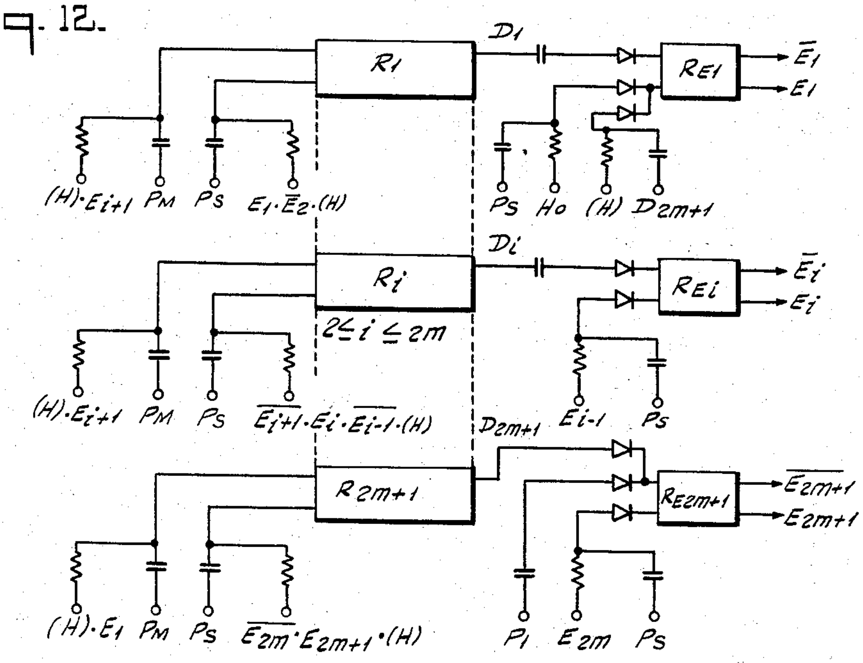
FIGURE 12 is a circuit diagram for the purpose of explaining the shift operation according to this invention.

FIGURE 12 is a diagram of the portions relating to the shift counter 15 and its operation will be more clearly understood when taken in connection with the description of the circuits of FIGURES 4 through 10. The dot which is interposed between two or more signals in the drawing indicates that these signals are introduced through an "and" gate.

First, under the condition that the counter $R_{2m+1}$ of the uppermost figure is cleared, when the timing pulse $P_1$ is fed to the supplemental flip-flop $R_{E2m+1}$, it is set and the output $E_{2m+1}$ is produced. Next, when the control counter signal (H) is fed to the whole register, the signal $\gamma_{2m+1}$ is fed to the counter $R_{2+1}$. At the same time, $\beta_{2m}$ which is the "and" signal of (H) and $E_{2m+1}$ is supplied to the counter $R_{2m}$, and thereby the timing pulse $P_M$ as the signal $\alpha_{2m}$ is introduced therein.

Assuming the contents of the counter $R_{2m}$ is $x$, the counter $R_{2m}$ produces the output $E_{2m}$ due to the incoming of the timing pulse $P_M$ in the number of $(10-x)$ pieces, the supplemental flip-flop $R_{E2m}$ is set, and thereby the signal $E_{2m}$ is produced and $E_{2m}$ is made to disappear. Accordingly, as the signal $\gamma_{2m+1}$ disappears, the timing pulse P*s* is no longer injected into the counter $R_{2m+1}$. As can be seen from FIGURE 3, the timing pulse P*s* is delayed from the phase of the timing pulse $P_M$, the number of the timing pulses P*s* supplied during the above mentioned time is $(9-x)$ pieces which is less by one than the number of the timing pulses P*m*, and this becomes the contents of the counter $R_{2m+1}$. In other words, the complement of the contents of the counter $R_{2m}$ is set in the counter $R_{2m+1}$. This operation shifts to the next figure due to the generation of the above mentioned output $E_{2m}$, and by repeating the same operation, the contents of all figures are shifted to the figure increased by one in the form of complement. Finally, when the supplemental flip-flop $R_{E1}$ of the first figure is set and the output $E_1$ is produced, the supplemental flip-flop $R_{E1}$ is reset by the next incoming timing pulse P*s*, the signal H*o* is fed thereto in case a round shift is not to be performed, and the counter $R_1$ finishes its operation under the condition that its contents is zero.

On the other hand, in case a round shift is to be performed, the signal H*o* is non-existent, the supplemental flip-flop is not reset, the timing pulse P*s* in the form of the signal is supplied to the counter $R_1$, and, at the same time, the timing pulse P*m*, in the form of the signal $\gamma_1$, is supplied to the counter $R_{2m+1}$. The supplemental flip-flop $R_{E1}$ is reset by the output $D_{2m+1}$ at the time that the contents of the counter $R_{2m+1}$ shifts from "9" to "0," and thereby both of the operations of the counters $R_1$ and $R_{2m+1}$ are ended. As a result, the contents of the first figure becomes such that the original contents of the "2*m*" figure is shifted, and the contents of the other figures respectively become such that the original contents of the next preceding figure is shifted. Thus, the shift or round shift is completed by causing the contents of the second and upper figures to become complements by the above mentioned method.

*Addition and subtraction operations*

Figures 13, 14:
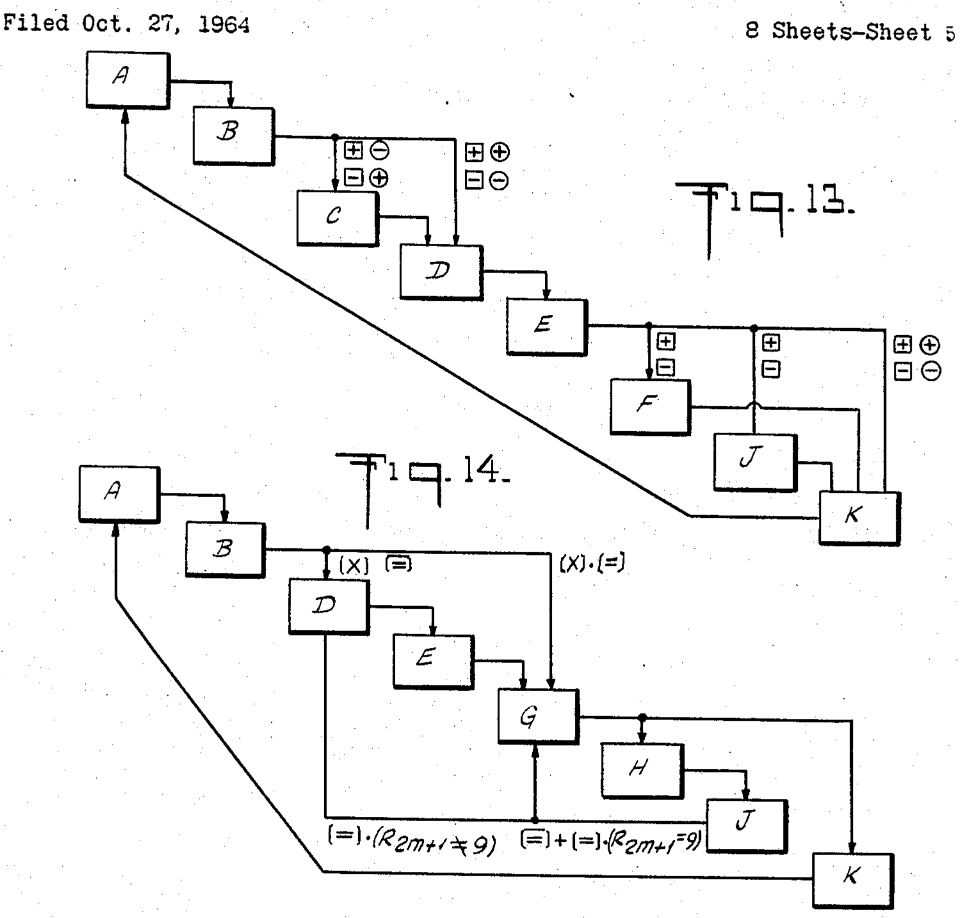
FIGURE 13 is an explanatory diagram of the operation processes of addition and subtraction according to this invention.
FIGURE 14 is an explanatory diagram for the operating processes of multiplication according to this invention.

The subtraction or addition operation is done in the order shown in FIGURE 13 after a summand or a minuend is memorized in the register 17 and then an addend or a subtrahend is set. In the drawing, [+] indicates an adding operation which is done by pushing the addition key of the keyboard, and [−] indicates a subtracting operation which is done by pushing the subtraction key of the keyboard. ⊕ ⊖ indicate the sign of the summand or the minuend, that is, the sign to be indicated in the sign window 3.

(1) In the case that a positive addend is to be added to a positive summand or in the case that a positive subtrahend is to be subtracted from a negative minuend by adding operation and by subtracting operation respectively, the sign of the answer does not vary, and its absolute value indicates a mere increase. In this case, the operation process shifts from the stop state A, to decimal point count B, addition D, and figure carry E, and reaches the ending state K. During the operation, the sign in the window 3 does not vary.

(2) In the case that a positive subtrahend is to be subtracted from a positive minuend by the subtracting operation or in the case that a positive addend is to be added to a negative summand by the adding operation, the operation process shifts from the stop state A through the decimal point count B to the complementizing state C in which the summand or the minuend is made a complement, then to the adding state D in which the addend or the subtrahend is added to said complement, and then to the figure carry state E in which the figure carry process is done.

(a) In the above case, if the absolute value of the summand or the minuend is larger than the absolute value of the addend or the subtrahend, the sign of the answer does not vary. As the figure carry output $E_{2m}$ is not generated from the uppermost figure in such a case as the above, the process shifts from said figure carry state E to the complementizing state J in which complerentization is done again, and then shifts to the ending state K.

(b) On the other hand, if the absolute value of the summand or the minuend is smaller than the absolute value of the addend or the subtrahend, the figure carry output $E_{2m}$ appears at the uppermost figure during said figure carry state E. In this case, "1" is added to the lowest figure as the end around carry based upon the output $E_{2m}$, the sign in the window 3 is simultaneously reversed, and the process shifts to the ending state K.

*Multiplication operation*

Multiplication is operated in the order shown in FIGURE 14. First, a multiplicand is set and multiplying key is pushed. Then, the multiplicand shifts from the stop state A through the decimal point count state B to the adding state D and figure carry state E in which said multiplicand is read-in in the lower half portion 1 of the register 17, that is, in the first through "*m*" figures, then to the shift preparing state G, shift state H and complementizing state J thereby a shift by one figure is accomplished, and by repeaing "*m*" times the states of said G, H and J, the multiplicand is shifted to the upper half portion 2 of the register, that is, to "$m+1$" through "$2m$" figures. At this time, the shift counter 15 is reset in the decimal point count state B, and increases the contents S*c* of the shift counter 15 by one each time that the shift preparing state G is over. Accordingly, when the contents S*c* of the shift counter becomes $m+1$, the process shifts from the shift preparing state G to the ending state K. On the other hand, each time that the shift state H is over, the contents of the decimal point counter 16, in which decimal point position is read-in in the decimal point count state, is increased by one.

Next, the multiplier is set, and the operating instruction key = is pushed. The shift counter 15 is reset in the decimal point count state B, the process shifts through the shift preparing state G to the shift state H in which each of the figures of the multiplicand is shifted in the form of a complement to the next succeeding figure, and the contents of the "$m+1$" figure becomes 0. Then, in the complementizing state J, the "$m+2$" through "$2m$" figures are converted into complements so that these are restored to the original number. As a result, accordingly, the multiplicand is shifted by one figure, and the digit of the uppermost figure is shifted in the form of a complement to the "$2m+1$" figure.

If the contents $R_{2m+1}$ of the "$2m+1$" figure is 9, the process is shifted from state J to state G, but if not, it is shifted to the addition state D. In the state D, the multiplier is repeatedly superimposed in the lower half portion 1 of the register 17 so that it is read-in, "1" is added to the "$2m+1$" figure for each reading-in operation, and said operation is repeated until the "$2m+1$" figure becomes "9." As a result, the product of the multiplier and the uppermost figure of the multiplicand is read-in in the lower half portion 1 of the register 17.

When the contents of the "$2m+1$" figure becomes "9," the process shifts through the figure to carry state E to G, H and J states wherein the upper half portion 2 and the lower half portion 1 of the register are simultaneously shifted, and if the contents of the "$2m+1$" figure is not "9," said repetitive reading-in of the multiplier and addition of one each time of said reading-in to the "$2m+1$" figure are done in D state until said contents becomes "9." Said shift and repetitive additions are repeated *m* times.

The contents of the shift counter, after it is reset in the decimal point count state B, increases by one each time that it passes through the shift preparing state G. Accordingly, when the shift and the repetitive addition are repeated *m* times, the contents S*c* of the shift counter becomes "$m+1$." Therefore, when the contents S*c* of the shift counter has become "$m+1$," the process has shifted from the state G to the ending state K having completed the multiplication operation, and the contents of the register is now the product wanted. The decimal point position of the product corresponds to "$2m+1$" and is subtracted from the contents of the decimal point counter.

*Division operation*

Figure 15:
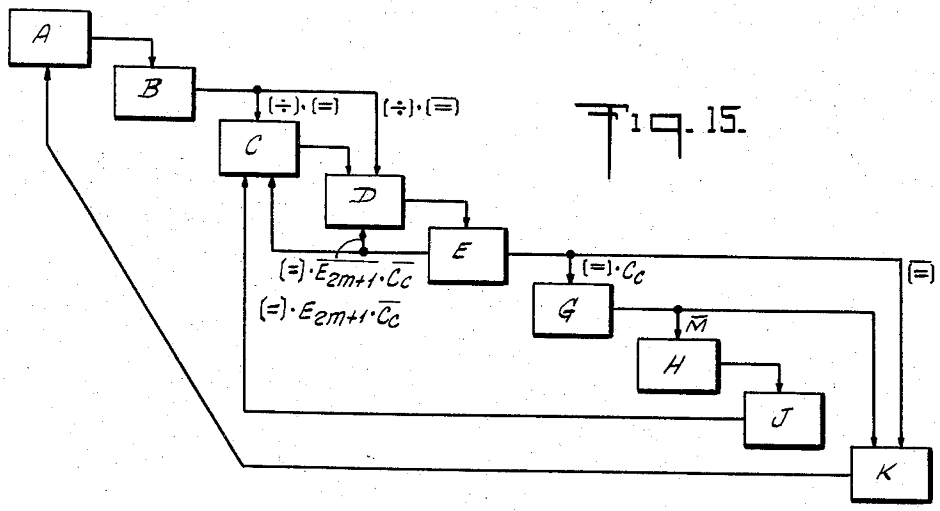
FIGURE 15 is an explanatory diagram for the operation processes of division according to this invention.

The division is operated in the order shown in FIGURE 15. First, the dividend is set and the division key ÷ is pushed, then the dividend passes through each of the states A, B, D, E and K, and is thereby read-in in the lower half portion 1 of the register 17. Next, the divisor is set and operation key = is pushed, then the process shifts from the state A through the state B to the state C wherein the digits of the upper half portion 2 of the register is converted into their complements. However, the contents of upper half portion 2 of the register at first is "0" throughout the figures, and, therefore, all of the figures are converted into "9." In the adding state D, the divisor is added to the upper half portion of the register, and at this time, the figure carry output $E_{2m+1}$ is produced from the "$2m+1$" figure. When said figure carry output is produced, the process is returned back to the complementization state C, thereby the upper half portion of the register is converted into complement again, the divisor is added again in the adding state D, the figure carry output $E_{2m+1}$ is thereby produced, and it restores the original contents at the time that the set figure was read-in. When the second figure carry output is produced, the shift signal C*c* is produced due to the operation of the supplemental flip-flop (not shown), and the process does not return to the state C but to the state G. Then, in the shift state H, the contents of all of the figures is shifted in the form of complement to the next succeeding figure, and by complementization of all figures but the first figure in the complementizing state J, one figure shift is completed.

The same operation as before is applied again to the shifted dividend, and at the itme that an addition of the divisor is done in the state D and if the figure carry output does not appear in the state E, "1" is added to the first figure and, at the same time, the process is returned back to the state D wherein the divisor is added again, the addition of "1" is done in the state E, and these operations are repeated until the figure carry output appears. Accordingly, the contents of the first figure is the number of repetitions of the addition of the divisor. When the figure carry output is produced in the state E due to the repetitive addition, the process is returned back to the state C wherein the upper half portion of the register is complementized, and the divisor is added again in the state D. As a result of said addition, the shift signal C*c* is generated from the supplemental flip-flop due to the figure carry output which is produced in the state E, and thereby one figure shift is done through the states G, H and J.

The above mentioned various operations are repeatedly performed, and when the division completion signal M is generated, the process shifts from the state G to the ending state K and the operation is complete, the answer, that is, the quotient, is obtained in the lower half portion 1 of the register, and the remainder is obtained in the upper half portion 2 of the register.

Figure 16:
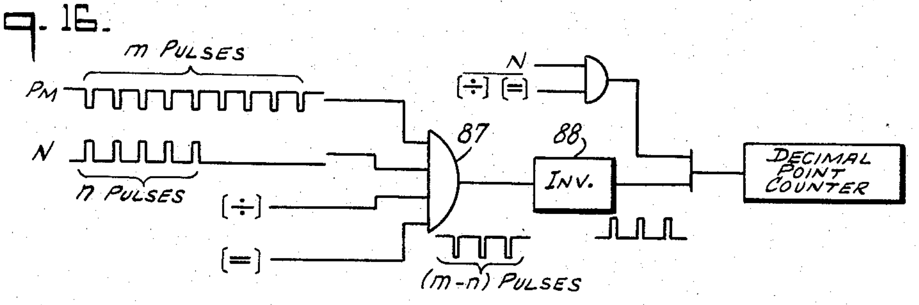
FIGURE 16 is a diagram for explaining the generating device for the operation completion signal shown in FIGURE 15.

The counting of the decimal point is done as follows. First, the decimal point of the dividend is counted, the complement in regard to "*m*" of the number of decimal point of the divisor is added thereto, and the number of times of the shifts at the time of operation is also added. The counted value as it is or minus $2m$ indicates the position of the decimal point of the quotient. If desired, the decimal point counter may be in the form of a ring counter which takes $2m$ states, then the indicated value will always be the decimal point position. Furthermore, the above mentioned complement in regard to "*m*" of the number which indicates the decimal point of the divisor can be easily obtained by the use of "and" gate 87 and inverter 88 as shown in FIGURE 16. With respect to the "and" gate 87, *m* pieces of timing pulses P*m*, *n* pieces of signal N which indicates the decimal point of the divisor, the division signal ÷ and operating signal = are given, its output is inverted by the inverter 88 becoming $(m-n)$ pulses, and is supplied to the decimal point counter 89. The decimal point counter signal which does not take the form of a complement is fed into the counter 89 by means of "or" gate 90.

The above mentioned division completion signal M is generated under the following conditons. In the above mentioned computer, the "remainder" is obtained in the "$m+1$" or higher figure, the number of figures of the quotient, therefore, cannot be counted until the effective digit appears at "$m$" figure. Accordingly, the first condition is that the number of times of the shift of the dividend from the lower half portion 1 to the upper half portion 2 of the register for the division operation is $m$ or more, and that the effective digit of the quotient appears in the "$m$" figure. In case the decimal point position of the quotient is $m$ or more, it tends to be mixed with the remainder in the upper half portion 2 of the register. Accordingly, the second condition is that the contents of the decimal point counter is $m$ or less, and that the number of times of the shifts is $m$ or more. When any of the above first and second conditions is met, said division completion signal M is generated, the operation cannot be continued any further, and further detailed answer cannot be obtained. It is apaprent that, if a detailed answer is not required, the operation can be terminated earlier.

Figure 17:
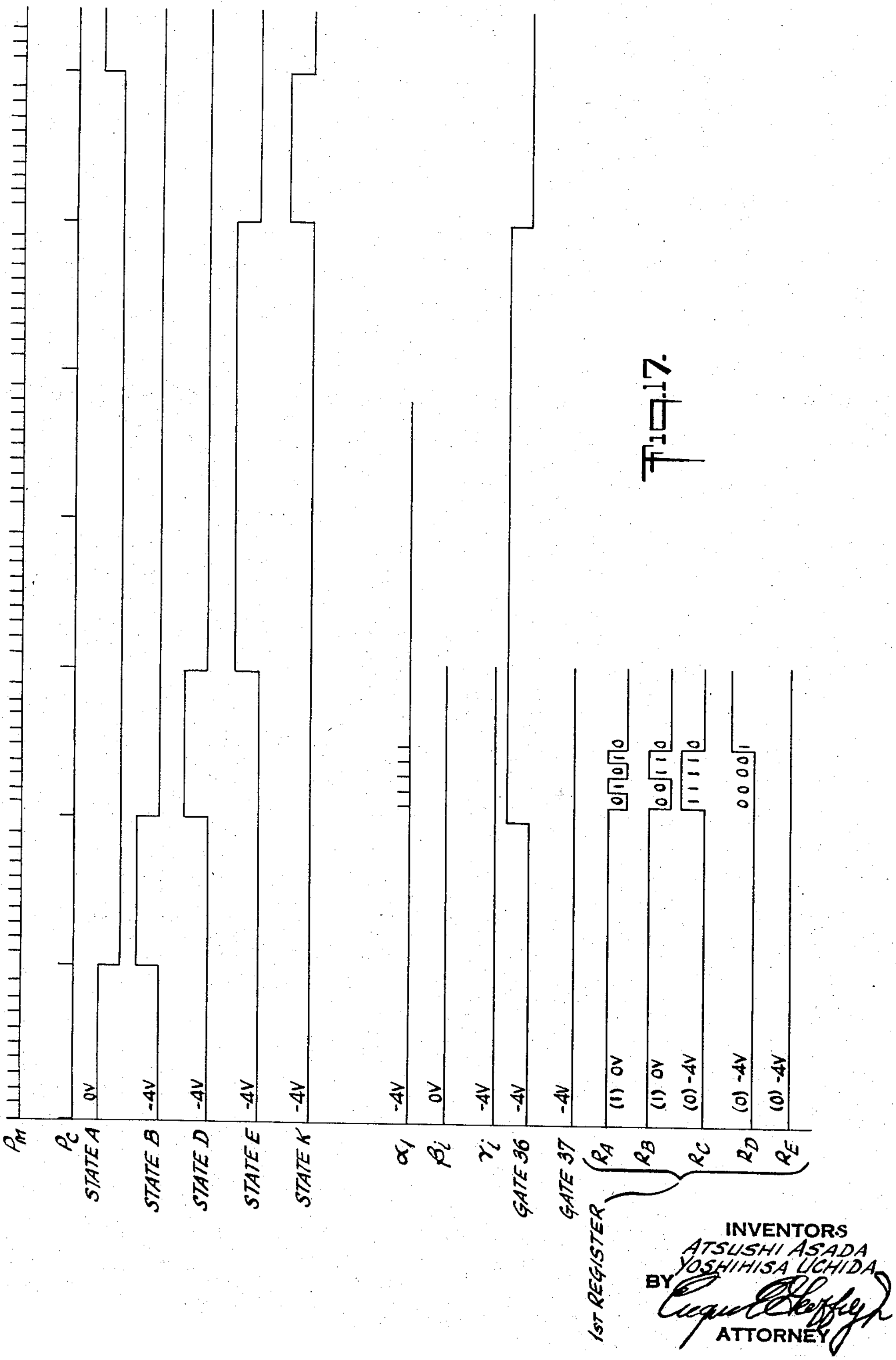
FIGURES 17, 18 and 19 are graphs illustrating the mode of operation of the computer in performing steps of addition and substraction.
Figure 18:
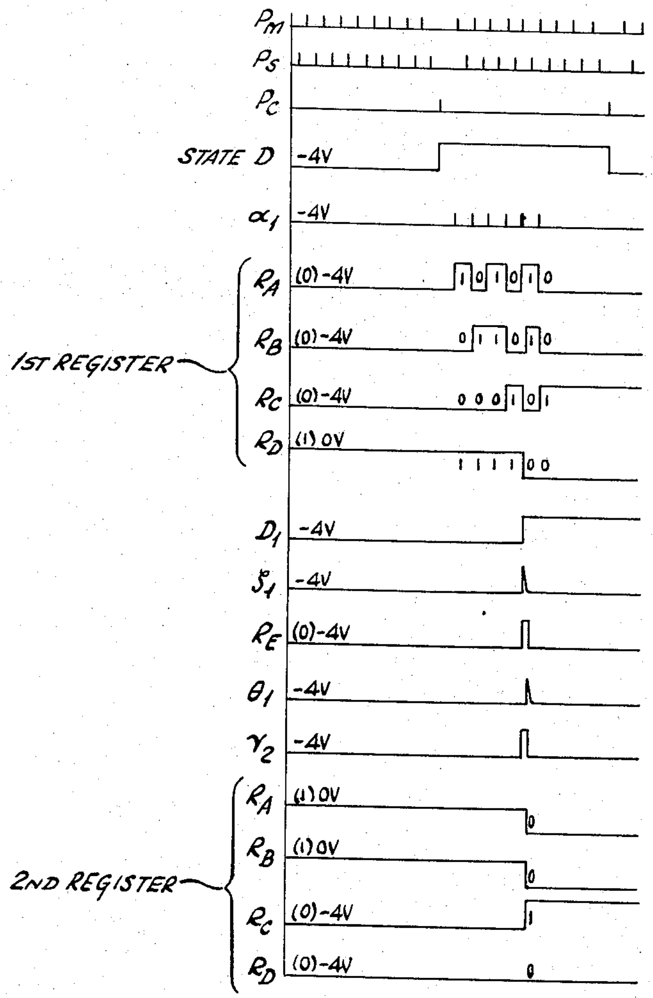
Figure 19:
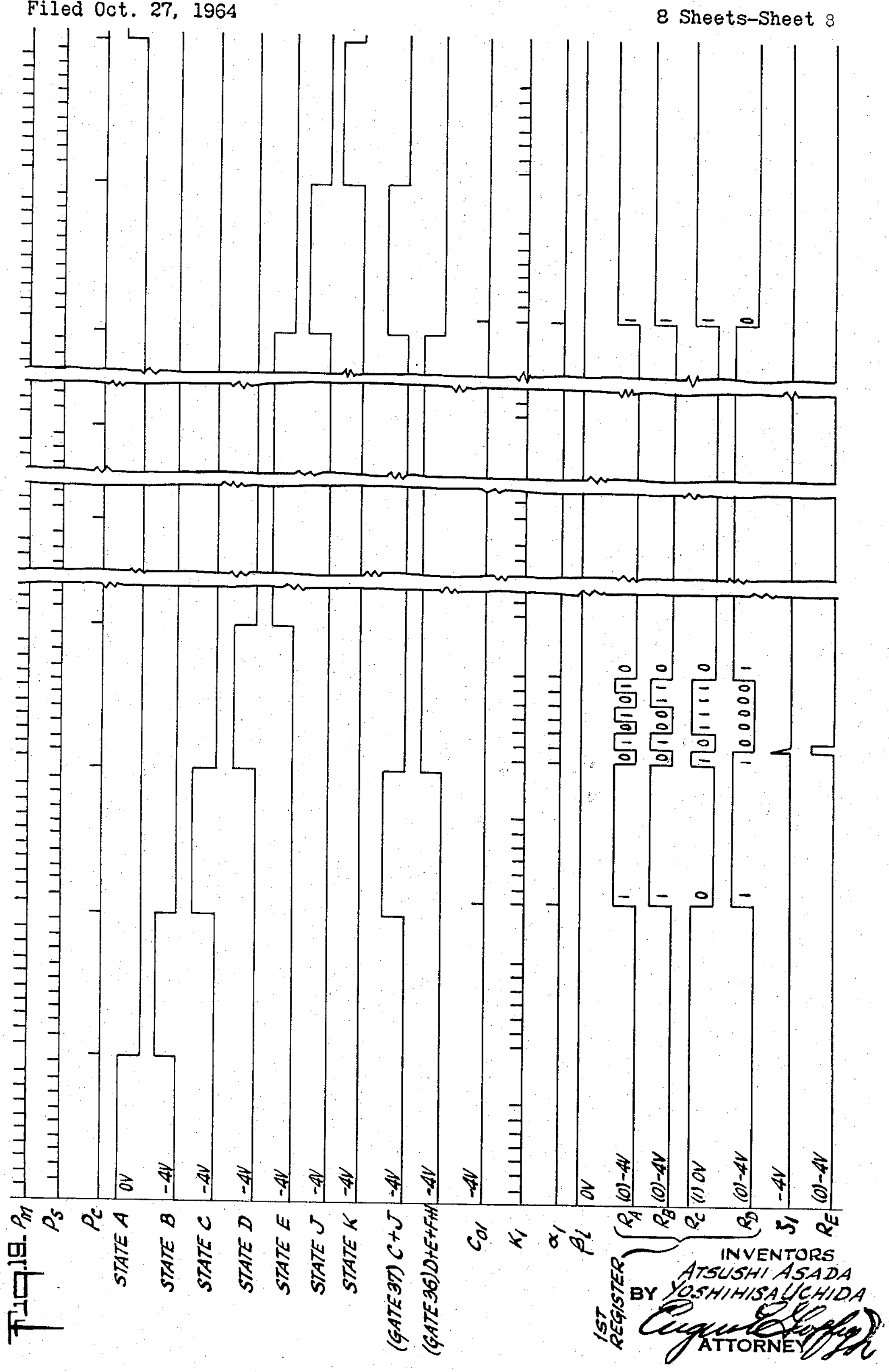

One example of the operation of the computer in accordance with the invention during the performance of adding and subtracting operations is illustrated in FIGURES 17, 18 and 19. FIGURE 17 illustrates the operation of the computer during the step of inserting the numeral 5. FIGURE 18 illustrates a step of adding the numeral 6 while FIGURE 19 illustrates the step of subtracting the numeral 7. For an understanding of these three figures, the P$m$, P$s$ and P$c$ signals have a base line at substantially $-4$ volts while the peaks of the pulses represent substantially zero volts. Each of the graphs carries the notation zero volts or $-4$ volts to indicate the magnitudes of the signals at the start of the computing operation. In the case of registers, namely $R_A$, $R_B$, $R_C$, $R_D$ and $R_E$, the numeral within the parenthesis indicates the condition of the individual flip-flop and in addition the voltage produced by the flip-flop whether it be zero volts of $-4$ volts. In this connection and with reference to FIGURE 17, the first register reads zero in the excess of 3 code and the flip-flop $R_A$ registers the numeral "1." This means that output from the "1" side of the flip-flop feeding into condenser 84 is zero voltage.

When the computer is energized, it continuously produces P$m$, P$s$ and P$c$ pulses in the sequence illustrated in the figures. This occurs during the state A even though no commands have been given to the computer. Referring specifically to FIGURES 17, let it be assumed that the numeral 5 is to be inserted. A key on the computer representing the numeral 5 is depressed and at the same time the addition key is also depressed. In the present example, a decimal count is not introduced, and, accordingly, state B as illustrated in the figure does not perform any function. Had a decimal point been introduced, an additional signal would have been generated to provide a visual indication of the decimal point during the period when state B attains a level of zero volts. At the occurrence of the second P$c$ pulse following the depression of the addition key, the computer assumes the addition phase and the voltage represented by state D attains zero volts. At this point, gate 36 passes zero voltage to the register. Since $\beta_1$ of the first register is at zero volts, the $\alpha_1$ signal of the first register will present five pulses to that register so that the first register will now indicate the numeral 5 in the excess 3 code. Thereafter the computer automatically returns to state A and all operations will terminate with the exception that the pulses P$m$, P$s$, and P$c$ continue to be generated as previously described. It should be pointed out that the third P$c$ pulse shown in FIGURES 17 operates to place the apparatus in state A and further that the number of pulses actually recorded is controlled by the gate 40 as shown in FIGURE 6 of the drawings.

In order to add a numeral to the numeral already registered, essentially the same procedure is followed with certain additional operations as illustrated in FIGURE 18. As pointed out, the computer is in the state A and let it be assumed that the numeral 6 is to be added. Accordingly, the appropriate key is depressed together with the addition button. State B will function as illustrated in FIGURE 17 and state D will shift to zero volts upon the occurrence of the next succeeding P$c$ pulse. After the occurrence of the P$c$ pulse, six $\alpha_1$ pulses of the first register will be introduced into that register. The register will automatically record the pulses in sequence until it reaches 9. The next successive pulse will cause the register to shift from 9 to zero and in so doing, the D$i$ signal of the first register will produce zero volts. The D$i$ pulse together with the signal from the state D, as illustrated in FIGURE 9A, produces a $\delta_1$ pulse. This pulse is introduced into the flip-flop $R_E$ of the first register and causes it to produce an output pulse having a maximum amplitude of substantially zero volts. In so doing, the output E$i$ from the flip-flop $R_E$ cooperates with the signal D as illustrated in FIGURE 8B to produce the $\gamma_1$ signal in the second register. During the presence of the $\gamma_1$ signal, a P$s$ pulse is fed to the second register to cause it to read one in the excess 3 code. The counting in the first register continues as illustrated in the drawings so that the computer will now indicate the sum of $5+6$ or 11.

FIGURE 19 illustrates the operation of the computer in a subtractive phase and for this purpose we will assume that the numeral 7 is to be subtracted from the total in the computer. At the conclusion of the addition step of FIGURE 18, the computer returned to the state A, and, accordingly, the voltages of the various signals illustrated in FIGURE 19 are the same as those illustrated in FIGURE 17 except for the fact that the first register indicates the numeral 1 whereas in FIGURE 17 it indicated the numeral zero. A key representing the numeral 7 is then depressed together with the subtraction key. To subtract, multiply, or divide, it is necessary to use a complement of the number presently in the computer. Accordingly, depression of the subtraction button will cause state C to shift from $-4$ volts to zero volts upon occurrence of the second P$c$ pulse. This signal operates through gate 37 and places zero signal at the input of flip-flops $R_B$, $R_C$ and $R_D$. The complement signal C$o_1$ causes the production of an $\alpha_1$ pulse in each of the registers of the computer. Thus the first register which had previously indicated the numeral 1 will now register the numeral 8. The second register (not shown in FIGURE 19) previously registered the numeral 1 and will now register the numeral 8. The remaining registers in the computer had previously registered zero and will now register 9. Upon the occurrence of the next P$c$ pulse following the generation of the complement pulse C$o_1$, the output of gate 36 goes to zero volts while the output of gate 37 returns to $-4$ volts. Thereafter the P$m$ pulse produces corresponding $\alpha_1$ pulses which are fed to the first register and since the seven key was depressed only seven pulses will be fed to the first register The first register will, therefore, read the numeral 5 in the excess 3 code. During the operation, the first register will shift from 9 to 0. In so doing, the $R_E$ flip-flop is operated by a $\delta_1$ pulse as previously described and thereby causes $\gamma_1$ pulse to be applied to the second register. During the existence of the $\gamma_1$ pulse, a P$s$ pulse is automatically fed to the second register causing it to read the numeral 9 in the excess 3 code. At a predetermined time following the completion of the adding operation just described, the computer is shifted to state J causing zero volts to be applied to the gate 37. Since the subtraction key was depressed, complement pulses C$o_1$ are produced repetitively by the computer. Therefore, the occurrence of a second C$o_1$ pulse places the computer in state J whereupon the complement pulse causes the application of $\alpha_1$ pulses to each of the registers. In so doing, all of the registers produce a visual indication of zero while the first register produces a visual indication of 4 which in the excess 3 code would be represented by the numeral 7. Thereafter the computer automatically returns to state A as previously described.

While only certain embodiments of the invention have been illustrated and described, it is apparent that alterations, modifications and changes may be made without departing from the true scope and spirit thereof as defined by the appended claims.

What is claimed is:

1. A register for a computer comprising at least four flip-flops each having two sections interconnected one with the other so that when one section representing 0 in the binary code is conducting the other section representing 1 in said code is nonconducting and vice versa, first connections between said one section of each flip-flop and both sections of the next succeeding flip-flop, second connections each including control means between the other section of each flip-flop and both sections of the next flip-flop, means simultaneously controlling each of said control means to interrupt and complete the associated connections and means for applying input pulses simultaneously to both sections of the first of said series of flip-flops whereby each input pulse applied to the first of said flip-flops when said control means are operated to interrupt the associated circuits will cause said flip-flops to register the next successive decimal digit in terms of a four bit binary code with the first said flip-flops representing the least significant bit and wherein the application of a pulse to the first said flip-flop when said control means are operated to complete the associated circuits will cause said flip-flops to register the complement of the number registered by said flip-flops prior to the application of the last said pulse.

2. A register according to claim 1 wherein the outputs of said other sections of the first and fourth flip-flops are connected through an "and" gate and second control means to the input of the other section of said third flip-flop, the output of said one section of the fourth flip-flop is connected through said second control means to the input of said one section of the second flip-flop and said control means are simultaneously operated by common controlling means to interrupt and complete their associated connections whereby the last control means are operated to open the associated connections for said counting and complement operations and are operated to complete the associated connections while the controlling means for said second connections is operated to interrupt such connections to cause the register to shift from 9 to 0 upon the application of an input pulse.

3. A register for a computer according to claim 1 wherein the first said connections each includes an RC differentiating network with the resistor being connected to a selected voltage and wherein the second said connections each include an RC differentiating network with the resistors thereof being connected to said controlling means and wherein said controlling means functions to complete said connections by applying said selected voltage thereto and functions to interrupt said connections by applying a voltage other than said selected voltage.

4. A register according to claim 3 wherein said connections are RC differentiating networks with said resistors being connected to said controlling means, the latter applying said selected voltage to the last said resistors to complete said connections and applying a voltage other than said selected voltage to interrupt said connections.

5. A register according to claim 4 wherein each input to each section of each flip-flop includes a series connected diode.

6. A register according to claim 5 wherein said register includes a carry flip-flop, connections between the carry flip-flop and a successive register of identical configuration and operable in response to a shift in said register from 9 to 0.

7. In a register according to claim 5 wherein said flip-flops function according to the "excess-3" code.

8. A register comprising a plurality of bistable flip-flops each representing a bit in the binary code and each plurality of flip-flops representing a decimal figure, said flip-flops being selectively connected each with the successive flip-flops to record pulses fed to the first flip-flop representing the least significant digit, first controlled means interconnecting certain of said flip-flops to shift said register from 9 to 0 and second controlled means interconnecting other of said flip-flops for causing said register to shift to the complement of the number upon application of an input pulse.

References Cited

UNITED STATES PATENTS 3,120,606 2/1964 Eckert et al. -------- 235—160

OTHER REFERENCES

Richards, R. K.: Arithmetic Operations in Digital Computers, p. 183, D. Van Nostrad Co. Inc., 1955.

MALCOLM A. MORRISON, *Primary Examiner.*

I. FAIBISCH, V. SIBER, *Assistant Examiners.*